Sept. 4, 1973     D. C. BONHAM     3,756,879
METHOD OF MANUFACTURING A HAIRPIECE
Original Filed Jan. 31, 1967
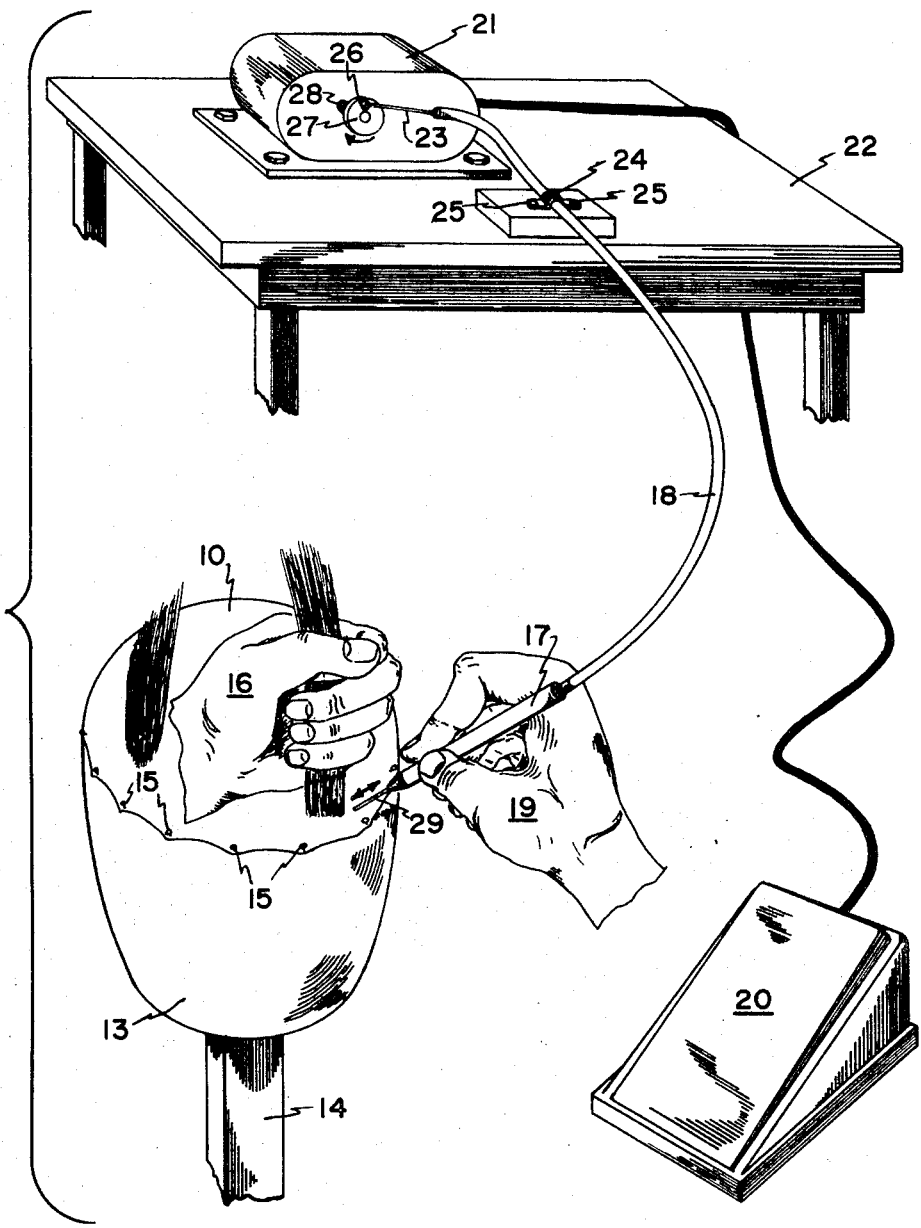
FIG. 1
FIG. 2
DAVID C. BONHAM
INVENTOR.
BY: 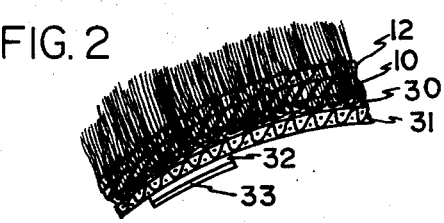
ATTORNEY

United States Patent Office 3,756,879
Patented Sept. 4, 1973

3,756,879
METHOD OF MANUFACTURING A HAIRPIECE
David C. Bonham, 3594 South 3610 East,
Salt Lake City, Utah 84109
Original application Jan. 31, 1967, Ser. No. 612,851, now Patent No. 3,523,802, dated Aug. 11, 1970. Divided and this application July 15, 1968, Ser. No. 744,754
Int. Cl. B32b 5/00
U.S. Cl. 156—72    3 Claims

ABSTRACT OF THE DISCLOSURE

A method of manufacture of a hairpiece having a silicone rubber covered scalp base into and through which hairs are individually inserted to be secured in place.

BRIEF SUMMARY OF THE INVENTION

This invention is related to the manufacture of hairpieces and is a divisional application of my presently co-pending application, Ser. No. 612,851, filed Jan. 31, 1967 now U.S. Pat. 3,523,802.

Hairpieces have been available for many years but they have not been readily accepted by the general public. This may be because heretofore they have not been realistic in appearance, were not comfortable to wear, or were difficult and expensive to maintain.

Principal objects of the present invention are to provide a hairpiece that is natural in appearance, that is made of lightweight materials that will not irritate the scalp of a wearer, and that is easily cared for.

To accomplish these objects, I construct a scalp base from silicone rubber having the coloring and texture of human skin and preferably reinforced with lightweight, strong, fabric mesh material, the interstices of which are thoroughly impregnated with the silicone rubber. Hairs are individually inserted into and through at least a portion of the scalp base and are anchored to the underside thereof so that the finished product has the appearance of a human scalp from which hair is growing.

THE DRAWING

FIG. 1, in somewhat schematic form, shows apparatus used in performing the method of the invention and shows a partially completed hairpiece of the invention; and FIG. 2 is an enlarged, fragmentary, vertical section taken through a hairpiece of the invention.

DETAILED DESCRIPTION

In the manufacture of a hairpiece in accordance with the present invention an inverse mold or "cap" is first formed on the top of the head of the individual to be fitted. The cap is removed, its interior is coated with a wax which serves as a release agent, and plaster is poured in and allowed to harden to form a model of the individual's head.

The cap is removed from the model and the area on the plaster model corresponding to the area on the individual's head to be covered with the hairpiece is marked and a thin coat of wax is spread thereover.

A scalp base 10 is constructed by first placing a base layer of silicone rubber 11, FIG. 2, over the area to be covered and allowing it to dry. This layer of silicone rubber is preferably opaque, but will normally be colored a greyish tone or such other color as may be necessary to produce a realistic appearing scalp base.

Next, a layer of clear silicone rubber is placed over the first layer and while it is still wet a piece of mesh material 12, preferably made of nylon fabric and colored to match the skin complexion of the intended wearer is placed smoothly over the model, the clear silicone rubber is carefully worked into and through the interstices of the mesh so that as it sets up it will laminate or bond the mesh to the first layer of silicone previously spread over the plaster model.

If desired, additional layers of mesh material, not shown, impregnated and covered with clear silicone rubber, can be placed over the top of the first one positioned. These will add additional strength to the finished hairpiece. Working of the silicone rubber into the interstices of the mesh makes the scalp base take on the skin color and smooth skin-like texture necessary for satisfactory appearance of the hairpiece. When properly worked the mesh material will be fully coated with the silicone rubber so that if the hairs of the hairpiece 15 are subsequently dyed, the reacting chemicals will contact only the impervious silicone rubber of the scalp base and cannot adversely affect the fabric material.

Once the desired layers of mesh material have been applied and the silicone rubber with which they are impregnated and covered has dried, the scalp base is ready to have hair attached.

Referring now to the drawing, the scalp base 10 is removed from the plaster model and is pinned in place over a block of elastomeric material shown at 13, carried by a support 14, with pins 15.

An operator takes a bunch of hairs (which may be synthetic, but preferably are real human hairs) in his hand 16, and holds them so that their ends are resting on the scalp base. He then grasps an enlarged portion 17 of cable housing 18 in his other hand 10 and operates foot pedal 20 to actuate motor 21, mounted on table 22.

Cable 23 reciprocates within the cable housing 18, which is anchored by band 24 and screws 25 to the table 22, and one end of the cable is bent and passed through a hole 26 eccentrically positioned in a plate 27 fixed on the shaft 28 of the motor. The other end of the cable has a blunt-ended needle 29 rigidly attached thereto. Thus, actuation of motor 21 to rotate shaft 28 and plate 27 rapidly reciprocates cable 23 within cable housing 18 and reciprocates needle 29, in much the same manner as a conventional sewing machine needle is rapidly reciprocated. Needle 29 must be kept blunt to successfully push the hairs through the scalp base 10 into rubber block 13. If it sharpens as it is used the operator must change needles, or, using a grindstone, not shown, to periodically blunt the end of the needle. It has been found that the silicone rubber does not tear as the needle is passed through and it therefore provides an excellent material for the scalp base.

The operator moves the reciprocating needle across the ends of the hairs in the bunch he is holding and the needle pushes them individually, or semi-individually, through the scalp base and into the block of elastomeric material, i.e. rubber block 13. If some of the hairs in the bunch are not forced through the scalp base, the operator simply discards them, grasps another bunch and repeats the operation. Repeating of the operation, with skillful placement of the hairs, allows any hair growth pattern to be simulated.

After the desired number of hairs have been inserted the scalp base is removed from rubber block 13 and as it is removed, the rubber block pulls the hairs even further through the scalp base. This is because the rubber of the block closes around each hair to frictionally grip it as the needle is withdrawn, and as the scalp base is removed from the rubber block and the hairs are pulled therefrom they are also pulled further through the scalp base.

The hairs are trimmed to a uniform length on the underside of the scalp base, and it is presently preferred that on the underside they be no longer than about one-fourth inch to avoid excess bulk.

A coating of flexible, non-toxic, epoxy sealant 30 is applied to the hairs and to the underside layer of silicone rubber on the underside of the scalp base and the scalp base is then pressed over the plaster mold, which has been previously coated with a wax or Mylar releasing agent, until the epoxy is dried. This firmly and permanently secures the hairs to the underside of the scalp base.

While other blocks soft enough to receive the blunt needle 29 can be used, and it is possible to push the hairs through without a block to receive them, use of the elastomeric block is preferred to insure that all hairs are pulled through far enough that they can be fully secured. Furthermore, while block 13 is shown in support 14, it should be obvious that it could be on table 22 or on any other desired support.

The hairpiece is removed from block 13 and another layer of silicone rubber is placed over the plaster mold and another piece of mesh material 31 is placed thereon and worked until the mesh is completely impregnated and covered with the silicone rubber. The hairpiece is one again placed on the plaster model, over the impregnated mesh, and is pressed thereon until it is dry and the silicone rubber has bonded to the hair, epoxy sealant and first layer of silicone rubber of the scalp base. The hairpiece is removed from the plaster block, the edges of the scalp base are trimmed, conventional adhesive strips 32, having protective covers 33 are applied to the undersurface and the hairpiece is ready to be styled and worn.

The final layer of silicone rubber impregnated and covered mesh material further helps to hold the hairs in place and also provides a smooth, comfortable surface to be placed against the scalp of a wearer.

The hairpiece is realistic in appearance, because the scalp base is colored and textured like the skin of a wearer and also because the hairs appear to be individually growing from the scalp base. It is made of extremely lightweight materials and is not uncomfortable to a wearer. Since the scalp base is made of silicone rubber it is resistant to cold, heat, and water and the hairpiece can be washed or shampooed in the same manner as normal, growing hair, without fear of its being damaged.

Whereas this invention is here described and illustrated with respect to a certain form thereof, it is to be understood that many variations are possible without departing from the subject matter particularly pointed out in the following claims, which subject matter I regard as my invention.

I claim:
1. A process of making a hairpiece comprising
forming a base layer of silicone rubber, dimensioned to fit a portion of a wearer's skull;
impregnating and covering a first piece of mesh material with silicone rubber;
spreading the impregnated first piece of mesh material over the base layer and allowing it to dry in contact therewith, to thereby form a laminated scalp base;
positioning the scalp base over a block of elastomeric material;
inserting ends of hairs, substantially individually, through said scalp base from the outside thereof and into the block of elastomeric material using a reciprocating blunt needle;
removing the scalp base and hairs passed therethrough from the block of elastomeric material;
applying an adhesive material to the interior of the scalp base to anchor the ends of the hairs projecting therethrough; and
pressing the ends of the hairs to the scalp base until the said adhesive material is dry.

2. A process according to claim 1, further including impregnating another piece of mesh material with silicone rubber and bonding the said other piece to the interior of the scalp base and the ends of the hairs anchored thereto.

3. A process of making a hairpiece comprising
forming a scalp base of silicone rubber adapted to fit on a portion of a wearer's skull;
inserting ends of hairs, substantially individually through the scalp base, from the outside thereof, using a reciprocating blunt needle; and
applying an adhesive material to the interior of the scalp base and to the ends of the hairs projecting therethrough to thereby securely anchor the hairs in place.

References Cited
UNITED STATES PATENTS

| | | | |
|---|---|---|---|
| 2,602,460 | 7/1952 | Hull | 132—53 |
| 2,636,460 | 4/1953 | Seiderman | 156—72 X |
| 3,077,891 | 2/1963 | Lane | 132—5 |
| 3,421,521 | 1/1969 | Rich, Jr. | 132—5 |

CARL D. QUARFORTH, Primary Examiner

S. J. LECHERT, Jr., Assistant Examiner

U.S. Cl. X.R.

156—280, 303.1, 329; 132—5